(12) United States Patent
Rake et al.

(10) Patent No.: US 10,352,350 B2
(45) Date of Patent: Jul. 16, 2019

(54) CABLE PULL WITH GUIDE BUSHING AND LENGTH COMPENSATION, TRANSMISSION ARRANGEMENT WITH A CABLE PULL

(71) Applicant: ZF Friedrichshafen AG, Friedrichshafen (DE)

(72) Inventors: Ludger Rake, Steinfeld (DE); Andreas Giefer, Lemfoerde (DE); Wolfgang Fortmann, Bohmte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 15/038,993

(22) PCT Filed: Oct. 28, 2014

(86) PCT No.: PCT/EP2014/073061
§ 371 (c)(1),
(2) Date: May 24, 2016

(87) PCT Pub. No.: WO2015/078644
PCT Pub. Date: Jun. 4, 2015

(65) Prior Publication Data
US 2016/0377111 A1 Dec. 29, 2016

(30) Foreign Application Priority Data
Nov. 28, 2013 (DE) .................. 10 2013 224 429

(51) Int. Cl.
*F16C 1/14* (2006.01)
*F16H 61/36* (2006.01)
*F16C 1/22* (2006.01)

(52) U.S. Cl.
CPC ............ *F16C 1/14* (2013.01); *F16C 1/223* (2013.01); *F16H 61/36* (2013.01); *F16C 2226/80* (2013.01); *F16C 2361/65* (2013.01)

(58) Field of Classification Search
CPC ............. F16C 1/14; F16C 1/223; F16H 61/36
See application file for complete search history.

(56) References Cited

U.S. PATENT DOCUMENTS 4,887,930 A  12/1989 Chaczyk et al.
5,156,064 A  10/1992 Truman
(Continued)

FOREIGN PATENT DOCUMENTS

CN   101463858 B  † 11/2010
DE   197 30 683 B4    2/1998
(Continued)

OTHER PUBLICATIONS

Define pivot point—Google Search, google.com., Oct. 11, 2018 (Year: 2018).*
(Continued)

*Primary Examiner* — Vinh Luong
(74) *Attorney, Agent, or Firm* — Brinks Gilson & Lione (57) ABSTRACT

A cable pull for transmitting a tensile and/or pressure force to a pivot point is presented. The cable pull has a counter bearing, a tie rod, an adjustment unit and a locking element. The counter bearing is designed to introduce a counter bearing into a casing of the cable pull, counter to the tensile and/or pressure force. The tie rod is axially supported in the counter bearing, and coupled to a wire core of the cable pull. The tie rod has a molded part on an end protruding out of the counter bearing, having a first component of a toothing. The adjustment element is designed to adjust a length of the cable pull between the counter bearing and the pivot point. The adjustment element has a guide for the molded part. The molded part can move axially in the guide, and is disposed such that it is guided transverse thereto. The locking element is designed to fix the molded part in place in the adjustment unit. The locking element is disposed in a recess in the adjustment unit oriented transverse to the guide, and can (Continued)

move between a locking position and an adjustment position. The locking element has a second component of the toothing, which is designed to engage in the first component in a form fitting manner when in the locking position, and to suppress the axial movement of the molded part in the guide.

17 Claims, 10 Drawing Sheets

(56) References Cited

U.S. PATENT DOCUMENTS

| | | | |
|---|---|---|---|
| 5,163,338 A † | 11/1992 | Sharp | |
| 5,222,411 A | 6/1993 | Hedstrom et al. | |
| 5,394,770 A | 3/1995 | Boike et al. | |
| 5,435,202 A † | 7/1995 | Kitamura | |
| 5,598,743 A | 2/1997 | Yasuda | |
| 5,934,150 A * | 8/1999 | Srinivas | F16C 1/14 403/104 |
| 6,116,111 A | 9/2000 | Burger | |
| 6,435,056 B2 * | 8/2002 | Meyer | F16C 1/105 403/104 |
| 7,044,018 B2 * | 5/2006 | Sanchez | F16C 1/108 403/135 |
| 2004/0129105 A1 * | 7/2004 | Gordy | F16C 1/105 74/502.4 |
| 2006/0236806 A1 * | 10/2006 | Ruhlander | F16C 1/226 74/502.6 |
| 2009/0049947 A1 * | 2/2009 | Horinaka | F16C 1/14 74/502.4 |
| 2010/0089195 A1 † | 4/2010 | Koontz | |
| 2010/0275715 A1 | 11/2010 | Ruhlander | |
| 2014/0169860 A1 † | 7/2014 | Meunier | |

FOREIGN PATENT DOCUMENTS

| | | |
|---|---|---|
| DE | 698 23 897 T2 | 5/2005 |
| EP | 0 927 830 A1 | 7/1999 |
| FR | 2 921 990 A1 | 4/2009 |
| JP | 2005-172203 A | 6/2005 |
| JP | 2006-17186 A | 1/2006 |
| JP | 2006057764 A † | 3/2006 |
| KR | 2017090191 * | 8/2017 |

OTHER PUBLICATIONS

Derwent English Abstract of KR 2017090191, Lee Byun, Aug. 7, 2017 (Year: 2017).*
International Search Report dated Jan. 20, 2015 in International Application No. PCT/EP2014/073061, 4 pages, German Language.
Written Opinion of the International Search Authority dated Jan. 20, 2015 in International Application No. PCT/EP2014/073061, 6 pages, German Language.
English Language Translation of International Search Report dated Jan. 20, 2015 in International Application No. PCT/EP2014/073061, 3 pages.
Office Action of Priority Application DE102013224429.0 dated Mar. 10, 2014, 5 pages, German Language.

* cited by examiner
† cited by third party

PRIOR ART

FIG 1

PRIOR ART

CABLE PULL WITH GUIDE BUSHING AND LENGTH COMPENSATION, TRANSMISSION ARRANGEMENT WITH A CABLE PULL

This application is a filing under 35 U.S.C. § 371 of International Patent Application PCT/EP2014/073061, filed Oct. 28, 2014, and claims the priority of DE 10 2013 224 429.0, filed Nov. 28, 2013. These applications are incorporated by reference herein in their entirety.

BACKGROUND OF THE INVENTION

The present disclosure relates to a cable pull, a transmission system, and a method for producing a cable pull, e.g. for a transmission system for a vehicle.

With a standard transmission, a shifting from one gear to another gear occurs through moving at least one control lever, which is disposed on the outside of a housing for the standard transmission. In order to move the control lever, a tensile force is transmitted to the control lever by a gear shift lever via a cable pull. Because the tensile force is transmitted from the gear shift lever to the control lever over a longer distance, manufacturing tolerances accumulate, which can be compensated for by adjusting the length of the cable pull.

US 2010/0275715 A1 describes a shift cable assembly and a connector for a shift cable assembly.

BRIEF SUMMARY OF THE INVENTION

With this background, the present disclosure creates an improved cable pull, an improved transmission system, and an improved method for producing a cable pull according to the independent Claims. Advantageous designs can be derived from the dependent Claims and the following description.

In order to design a cable pull such that its length can be adjusted, two components of the cable pull, which are each connected to opposite ends of the cable pull, are designed such that they can be displaced against one another. For this, a secure connection between the displaceable components is necessary in order to be able to securely transmit the tensile force.

The two components can be designed such that they can be latched in predefined steps. The latching can occur by means of a locking element, which transmits the tensile force from one component to the other component. Through the latching, the tensile force can be transmitted by a form fit. A form fit is reliable, because the latched components must be moved transverse to a direction of force in order to separate the form fit, which is only possible if an external force is applied.

A cable pull for transmitting a tensile force to a pivot point is presented, wherein the cable pull has the following features:

a counter bearing for introducing counter force, directed against the tensile force, into a casing of the cable pull;

a tie rod, which is axially supported in the counter bearing, and is coupled to the wire core of the cable pull, wherein the tie rod has a molded part with a first component of a toothing on an end protruding out of the counter bearing;

an adjustment unit for adjusting a length of the cable pull between the counter bearing and the pivot point, wherein the adjustment has a guide for the molded part, wherein the molded part can be moved axially in the guide, and is disposed such that it is guided transverse thereto; and a locking element for securing the molded part in the adjustment unit, wherein the locking element is disposed in a recess in the adjustment unit that is oriented transverse to the guide, and can be moved between a locking position and an adjusting position, wherein the locking element has a second component of the toothing, which is designed to engage in a form fitting manner in the first component when in the locking position, and suppress the axial movement of the molded part in the guide.

The cable pull can be used, for example, for a transmission system for a vehicle. A cable pull can be understood to be a Bowden cable. A pivot point can be a force application point for the tensile force. A casing can be a pressure resistant hose, in which the wire core of the cable pull is disposed. The wire core can be stable in the direction of the tensile force. A counter bearing can be one end of the casing. The tie rod can be oriented in the extension of the casing and the cable. The tie rod can be moveably supported along its main axis of extension. A molded part can be produced as a component of the tie rod, through a shaping of a part of the tie rod. The first component can be shaped or cut into the molded part. The adjustment unit can be connected directly to the pivot point. The molded part can move within an adjustment region in the guide of the adjustment unit. The locking element can have contact surfaces to the adjustment unit, oriented transverse to the tensile force. The second components of the toothing can provide contact surfaces to the molded part, which engage only when in the locking position.

The toothing can preferably have a tooth pitch that is less than a millimeter, more preferably less than three quarters of a millimeter, or more preferably less than one half of a millimeter. The tensile force can be transmitted via such small teeth by means of an advantageous pairing of materials in the toothing. As a result, the length of the pull cable can be adjusted particularly precisely.

The locking element can have an insert. This insert can be made from a material that can be loaded more heavily than the material from which the rest of the locking element is formed. A more heavily loadable material can have a greater tensile strength, compression strength and/or shear strength than a less heavily loadable material. By way of example, the locking element can have a locking insert made of a material that has a greater tensile strength, compression strength and/or shear strength than a material used for the locking base body. For this, at least a part of the second component of the toothing can be formed on the insert. With a material that can be loaded more heavily, a large force can be transmitted via a small area, without causing material damage. As a result of the material that can be more heavily loaded, the locking element can be designed in a compact manner.

By way of example, the material for the insert can be a metal substance, and the material for the locking element can be a plastic substance. A metal substance can result in a material pairing with the molded part that can be more heavily loaded than a material pairing between the plastic substance and the molded part.

The molded part can have a rectangular cross section, wherein the first component of the toothing can be disposed on two opposing lateral surfaces of the molded part. As a result, the first component can be oriented in a movement direction of the locking element. As a result, the teeth of the locking element can mesh with the teeth of the molded part.

The locking element can be U-shaped, wherein the second component of the toothing is disposed on the inside of the legs of the U. As a result of the U-shape, the molded part can be enclosed on at least two sides. As a result of the U-shape, lateral ejection forces, which occur in the toothing when tensile force is applied, can be stabilized in the U, in order to prevent a slipping of the toothing.

The molded part can have a thickening on an end lying opposite the cable pull, which extends beyond the first component of the toothing. The thickening can rest thereby on lateral walls of the guide, and the first component can exhibit a spacing to the lateral walls. The thickening can be designed as a stop, to provide a protection against loss.

The locking element can have at least one locking lug, which is designed to engage with a first edge of the adjustment unit body in a form fitting manner, when in the adjustment position, in order to secure the locking element against removal from the recess. The locking lug can be designed to engage in a form fitting manner, when in the locking position, on a second edge of the adjustment unit body, in order to secure the locking element against a removal from the locking position. The locking lug can have a bevel, by means of which the locking lug is pressed into the recess when moved into the locking position. By locking it into the adjustment position and the locking position, lateral forces can be absorbed, which move the locking element from the locking position into the adjustment position, or from the adjustment position out of the recess. As a result of the bevel, a movement of the locking element into the adjustment position and from the adjustment position into the locking position without tools is enabled.

The locking element can have a sliding surface for the first component of the toothing. The sliding surface can be disposed, thereby, adjacent to the first component when in the adjustment position, and offset to the toothing when in the locking position. A sliding surface can be oriented in a plane with the tops of the teeth of the first component. The sliding surface can prevent a twisting of the molded part in the guide. The sliding surface can serve as a stop for the thickening of the molded part, when in the adjustable state, in order to define the adjustment range, and to prevent an unintended separation of the adjustment unit and the tie rod.

The toothing can be designed with insertion bevels. A blocking of the first component and the second component when the locking element is moved from the adjustment position into the locking position can be prevented by at least one insertion bevel.

Furthermore, a transmission system having a transmission with a pivot point and a gearshift lever is presented. The transmission system furthermore has a cable pull in accordance with the approach presented herein, wherein the cable pull connects the gearshift lever with the pivot point, and is designed to transmit a tensile force from the gearshift lever to the pivot point, wherein two counter bearings disposed on opposing ends of the casing are designed to support the counter force to the tensile force.

Furthermore, a method for producing a cable pull is presented, wherein the method comprises the following steps:

provision of a molded part on the tie rod coupled to the a wire core of the cable pull, having a first component of a toothing, wherein the tie rod is axially supported in a counter bearing connected to a casing of the cable pull;

provision of an adjustment unit for adjusting a length of the cable pull between the counter bearing and the pivot point, wherein the adjustment unit has a guide for receiving the molded part and a recess for receiving a locking element;

provision of the locking element for securing the molded part in the adjustment unit, wherein the locking element has a second component of the toothing, which is designed to engage in a form fitting manner in the first component, and to suppress the axial movement of the molded part in the guide.

arrangement of the molded part in the guide of the adjustment unit; and insertion of the locking element into the recess, until the locking element is disposed in an adjustment position, in which the molded part is connected to the adjustment mechanism, such that it is secured against loss.

BRIEF DESCRIPTION OF THE SEVERAL VIEWS OF THE DRAWINGS

The disclosure shall be explained in greater detail based on the attached drawings, in an exemplary manner. Therein.

DETAILED DESCRIPTION OF THE INVENTION

In the following description of preferred exemplary embodiments of the present disclosure, the same or similar reference symbols are used for elements having a similar function depicted in the various figures, wherein there shall be no repetition of the descriptions of these elements.

Figure 1:
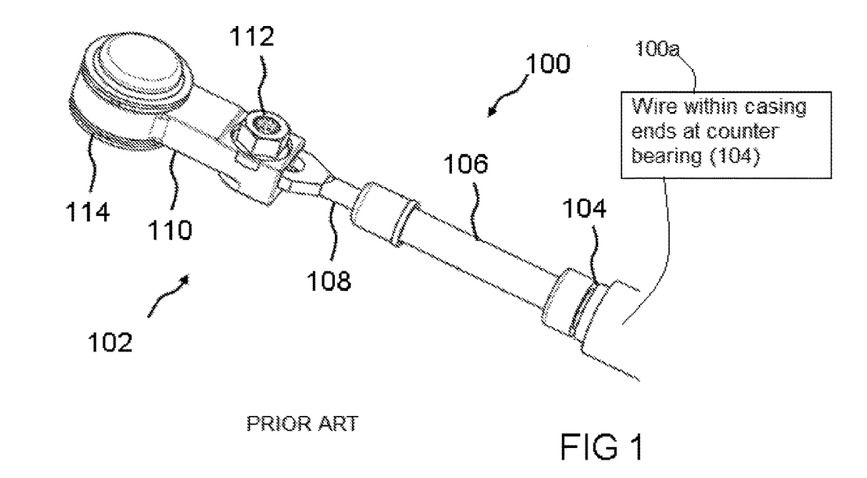
FIG. 1 shows a depiction of a cable pull with a continuously variable length adjustment mechanism.

FIG. 1 shows a depiction of a cable pull 100 having a continuously variable length adjustment mechanism 102. The cable pull 100 is illustrated in a spatial depiction. The cable pull 100 has a wire core (100a, shown schematically in FIG. 1), for transmitting a tensile force. The wire core 100a is inserted into a flexible casing, which is likewise not depicted. The casing is tube-shaped. The cable pull 100 can also be referred to as a Bowden cable. The casing ends in a counter bearing 104 on each end. The counter bearing 104 is supported at a fixed point in order to transmit a counter force against the tensile force. The casing is thus subjected to a pressure, which is oriented, respectively, counter to the tensile force. The counter bearing 104 has a rigid sleeve 106, which is designed as a linear sliding bearing for a tie rod 108. The sleeve is oriented in the extension of the sleeve, in order to ensure a tangential attachment of the cable to the tie rod 108. The tie rod 108 is flattened at a free end thereof, and has an axially oriented elongated hole in the flattened part. The flattened part is inserted in an end piece 110, and clamped in a force-locking manner in the end piece using a screw connection 112. The screw connection is formed a hexagonal screw and a nut secured against turning, in this case. The end piece 110 has a ball lining 114, which is designed to transmit the tensile force to a ball pivot serving as the pivot point.

Figure 2:
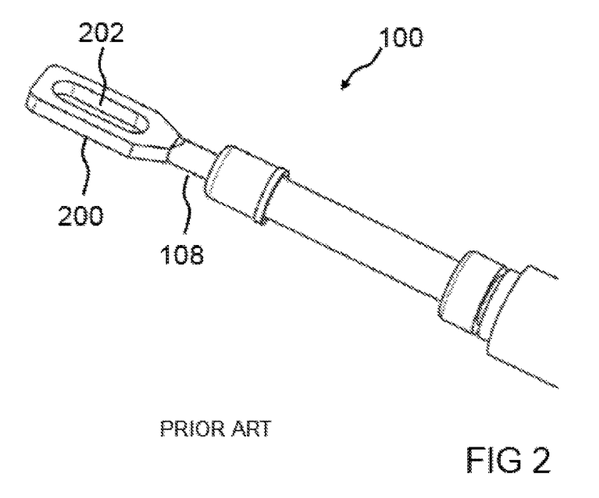
FIG. 2 shows a depiction of a cable pull with a tie rod for a continuously variable length adjustment mechanism.

FIG. 2 shows a depiction of a cable pull 100 with a tie rod 108 for a continuously variable length adjustment mechanism. The cable pull 100 corresponds substantially to the cable pull in FIG. 1. In contrast thereto, the tie rod 108 is depicted with the flattened end 200, without components attached thereto in this case. The elongated hole 202 is disposed centrally in the end 200.

With the cable pull 100 depicted in FIGS. 1 and 2, the cable pull adjustment occurs in a continuously variable manner, by means of a screw connection.

Figure 3:
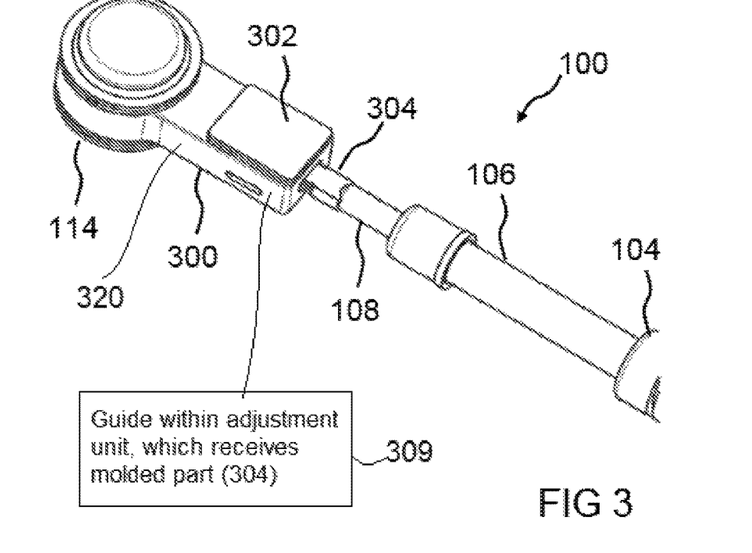
FIG. 3 shows a depiction of a cable pull with a form fitting force transmission in accordance with an exemplary embodiment of the present disclosure.

FIG. 3 shows a depiction of a cable pull 100 with a form fitting force transmission in accordance with an exemplary embodiment of the present disclosure. The cable pull 100 is shown in a spatial depiction. The cable pull 100 is designed to transmit a tensile force to a pivot point. The cable pull 100 has a counter bearing 104, a tie rod 108, an adjustment unit 300 and a locking element 302. The counter bearing 104 is designed to introduce a counter force, opposing the tensile force, into a casing of the cable pull 100. The tie rod 108 is axially supported in the counter bearing 104, and coupled to a wire core (100a, FIG. 1) of the cable pull 100. The tie rod 108 has a molded part 304 on an end protruding out of the counter bearing 104, having a first component of a toothing. The adjustment unit 300 is designed to adjust a length of the cable pull 100 between the counter bearing 104 and the pivot point. The adjustment unit 300 has a guide (309, depicted schematically in FIG. 3) for the molded part 304. The molded part 304 can move axially in the guide 309, and is disposed such that it is guided in a direction transverse thereto. The locking element 302 is designed to secure the molded part 304 in the adjustment unit 300. The locking element 302 is disposed in a recess in the adjustment unit 300 that is oriented transverse to the guide 309. The locking element 302 can move between a locking position and an adjustment position. The locking element 302 has a second component of the toothing. The second component is designed to engage in a form fitting manner in the first component when in the locking position, and to suppress the axial movement of the molded part 304 in the guide 309. The second component is designed such that it is a mirror image of the first component. The locking element 302 is shown in the locking position here.

In an exemplary embodiment, FIG. 3 shows a cable pull adjustment 300 with 0.5 mm detent. Package advantages can be obtained through the approach presented here. Likewise, the cable pull 100 can be easily adjusted with the approach presented here. As a result of the form fitting connection of the locks by means of clips, the security of the connection can be increased, despite the adjustability. With detents of less than 0.5 mm, a real system adjustment "transmission/shift" can be ensured. Furthermore, the form fitting connection can transmit large actuation forces of greater that 1,000 N.

In one exemplary embodiment, a compression spring is disposed between the end piece 300 and the sliding piece 106.

Figure 4:
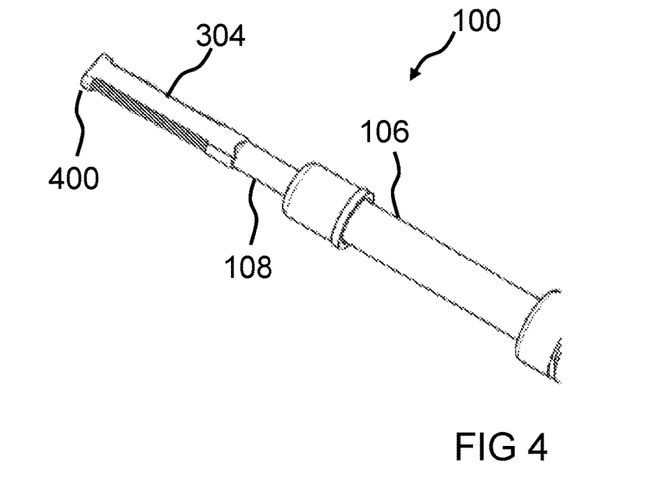
FIG. 4 shows a depiction of a cable pull with a molded part for a form fitting force transmission in accordance with an exemplary embodiment of the present disclosure.

FIG. 4 shows a depiction of a cable pull 100 having a molded part 304 for a form fitting force transmission in accordance with an exemplary embodiment of the present disclosure. The molded part 304 has a rectangular cross section. The first component of the toothing is on two opposing lateral surfaces of the molded part 304. The toothing has a tooth pitch of less than one millimeter. Until now, toothing having a tooth pitch of one millimeter or greater could be produced. The approach presented here now enables toothing with a smaller tooth pitch to be produced, wherein the tooth pitch can be <1 millimeter, <0.75 millimeter, or, as depicted, <0.5 millimeter. The toothing has elongated teeth, which are oriented transverse to an axis of the tie rod 108. The molded part 304 has a thickening on an end lying opposite the tie rod 108, which extends beyond the first component of the toothing.

In other words, FIGS. 3 and 4 show a quick adjustment system for a cable pull 100, having a securing device for the adjustment unit in the delivery state. The quick adjustment system has a ball lining 114, an end piece 300, a sliding bolt 108, a quick adjustment device 302, and a cable pull counter bearing 104. The ball lining 114 can be connected to a ball pivot. The quick adjustment device 302 can be deactivated and activated, and locked in place in both states.

Figure 5:
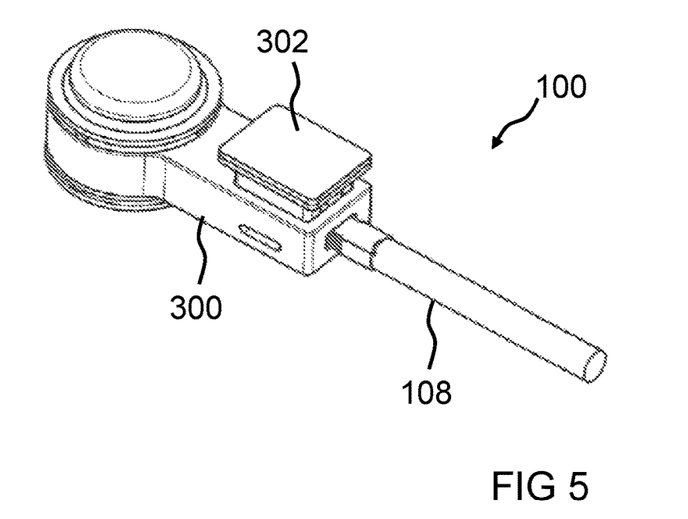
FIG. 5 shows a depiction of a cable pull in the adjustable state, in accordance with an exemplary embodiment of the present disclosure.

FIG. 5 shows a depiction of a cable pull 100 in the adjustable state, in accordance with an exemplary embodiment of the present disclosure. The cable pull corresponds substantially to the cable pull depicted in FIG. 3. The counter bearing and the sleeve are not depicted here. The locking element 302 is depicted in the adjustment position here. The locking element 302 is disposed in the recess of the adjustment unit 300, and locked in place in the adjustment position. The adjustment position corresponds to an intermediate position of the locking element 302, while the locking position corresponds to an end position of the locking element 302 in the recess.

Figure 6:
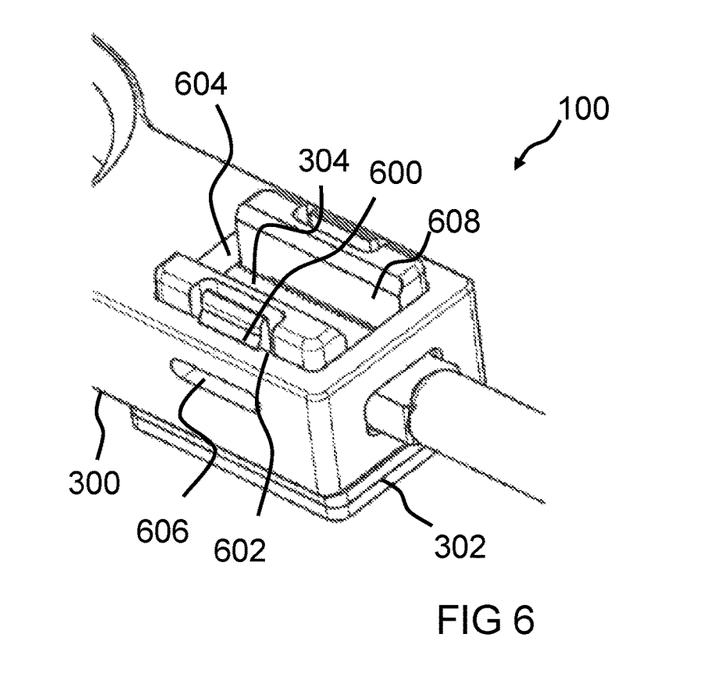
FIG. 6 shows a detail view of a cable pull in a locked state, in accordance with an exemplary embodiment of the present disclosure.

FIG. 6 shows a detail view of a cable pull 100 in the locked position, in accordance with an exemplary embodiment of the present disclosure. The cable pull 100 corresponds substantially to the cable pull depicted in FIG. 3. The cable pull is depicted from the opposite side as that in FIG.

3. The locking element 302 is substantially U-shaped. The locking element 302 has two identical legs thereby, between which the molded part 304 is disposed. The legs each have a portion of the second component of the toothing on their inner surfaces. In the locked state, the components of the toothing of the molded part 304 and the locking element 302 engage with one another, and form the form fitting connection. The locking element 302 has at least one locking lug 600. The locking lug 600 is designed to engage with an edge 602 of the adjustment unit 300 in a form fitting manner when in the locking position, in order to secure the locking element 302 against removal from the locking position. By pushing back on the locking lug 600, the locking element 302 can be unlocked, and pushed out of the locking position into the adjustment position. The length of the cable pull 100 can then be readjusted.

In the depicted exemplary embodiment, the locking element 302 has two opposing locking lugs 600, which are latched onto two opposing edges 602. The edges are formed here by edges of the recess 604.

The adjustment unit 300 has pockets 606 in the side walls. The pockets 606 each present a second edge for the locking lugs 600 to latch into in the adjustment position. The pockets 606 are formed here as cut-outs.

In an exemplary embodiment that is not shown, the edges for the latching position 602 are formed by further pockets in the lateral walls of the recess 604.

The locking element 302 has at least one sliding surface 608 for the first component of the toothing. The sliding surface 608 is disposed adjacent to the first component when in the adjustment position. In the locking position, the sliding surface 608 is disposed offset to the toothing, as shown here.

In the depicted exemplary embodiment, the locking element 302 has two opposing sliding surfaces 608, facing each other, disposed on the inner surfaces of the legs. The sliding surfaces 608 and the two components of the toothing are disposed in a plane, wherein the direction of movement for the locking element 302 lies between the locked state and the adjustment state in this plane.

Figure 7:
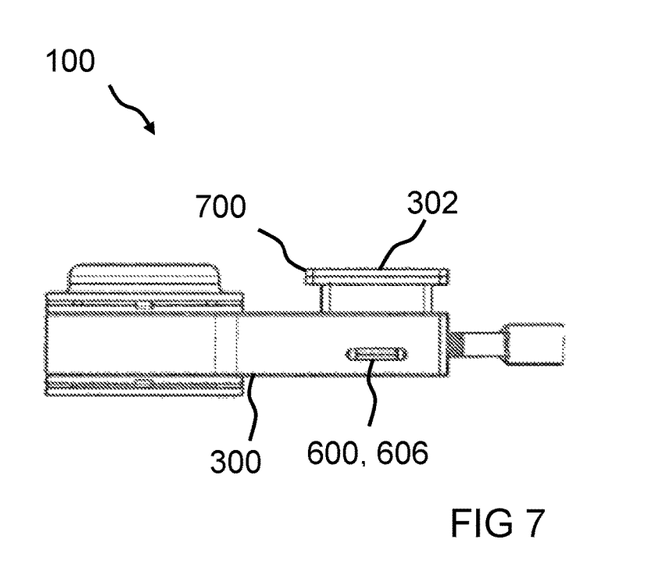
FIG. 7 shows a side view of a cable pull in an adjustable state, in accordance with an exemplary embodiment of the present disclosure.

FIG. 7 shows a side view of a cable pull 100 in the adjustable state, in accordance with an exemplary embodiment of the present disclosure. The cable pull 100 corresponds substantially to the cable pull depicted in FIG. 5. The locking element 302 is disposed in the adjustment position, in which the molded part 304 can move axially in the guide. The locking lug 600 is designed to engage with the edge 606 of the adjustment unit 300 in a form fitting manner when in the adjustment position, in order to secure the locking element 302 against removal from the recess. It can be seen through the cut-out 606 how the locking lug 600 is locked in place on the second edge 606. As a result, the locking element 302 is safeguarded against loss. The locking element 302 has an encompassing flange 700, which is at a spacing to the adjustment unit 300 when in the adjustment position.

In other words, the pre-latch is clipped in FIG. 7, in the delivery state.

Figure 8:
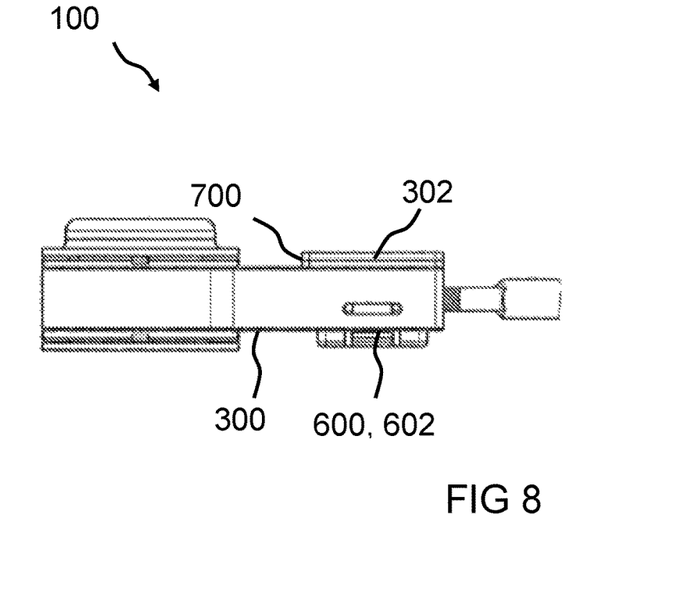
FIG. 8 shows a side view of a cable pull in the locked state, in accordance with an exemplary embodiment of the present disclosure.

FIG. 8 shows a side view of a cable pull 100 in the locked state, in accordance with an exemplary embodiment of the present disclosure. The cable pull 100 corresponds to the cable pull in FIG. 7. The locking element 302 is disposed in the locking position here, in which the molded part 304 is axially fixed in place. The locking lug 600 is latched onto the edge 602. The flange 700 now rests against the adjustment unit 300.

Figure 9:
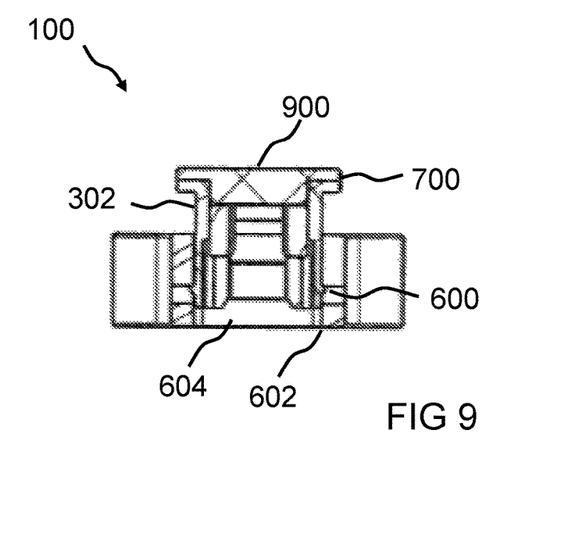
FIG. 9 shows a cross sectional depiction of a cable pull in an adjustable state, in accordance with an exemplary embodiment of the present disclosure.

FIG. 9 shows a cross sectional depiction of a cable pull 100 in the adjustable state, in accordance with an exemplary embodiment of the present disclosure. The cross section runs at a right angle through the locking element 302 in the adjustment position. The cable pull 100 thus corresponds substantially to the cable pull in FIG. 7. The locking lug 600 has a bevel, by means of which the locking lug 600 is pushed into the recess 604 when moving from the adjustment position into the locking position. Upon reaching the locking position, the locking lug again snaps over the edge 602. It is also shown here that the locking element 302 has an insert made of a material that can be loaded more heavily than the material of the locking element 302, wherein at least a part of the second component of the toothing is formed on the insert 900. The insert 900 exhibits a metallic substance. The locking element 302 exhibits a plastic substance. The flange 700 of the locking element 302 has two layers. The insert 900 forms a metallic cover layer, disposed on a lower layer made of plastic. The insert 900 is disposed in a central recess of the locking element 302. The insert 900 is U-shaped, like the locking element 302, with the exception of the flange 700. The second component of the toothing is disposed on the inner surfaces of the legs of the insert 900. The toothing is formed with insertion bevels.

In one exemplary embodiment, the requirements for the form fitting connection by the latching are fulfilled by means of clips, the adjustability requirements are fulfilled with a detent having a maximum size of 0.5 mm, and the requirements regarding transmission forces of the form fitting connection of greater than 1,000 N are fulfilled by a metallic insert 900 having detent steps of less than 0.5 mm. In order for the locking element 302 to be able to be cleanly latched in intermediate positions, the teeth of the detent are formed with an insertion bevel.

In one exemplary embodiment, the metallic insert 900 is made of a sintered metal.

In one exemplary embodiment, the metallic insert 900 is formed by means of powder injection molding, metal injection molding MIM.

In one exemplary embodiment, with reduced requirements regarding the transmission force in the cable pull, the insert 900 of the locking element 302 is made of high-tensile plastic.

In other words, FIG. 9 shows a quick adjustment device 302 having two components 900. The insert can also be referred to as a latching element.

Figure 10:
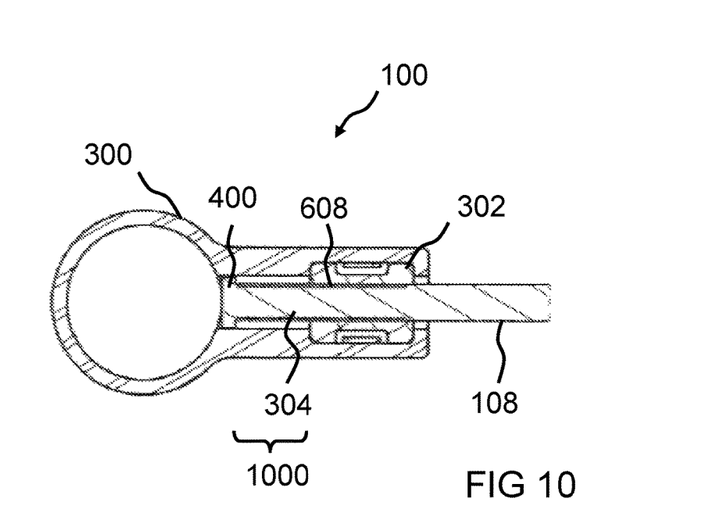
FIG. 10 shows a longitudinal section of a cable pull in an adjustable state, in accordance with an exemplary embodiment of the present disclosure.

FIG. 10 shows a longitudinal section of a cable pull 100 in the adjustable state, in accordance with an exemplary embodiment of the present disclosure. The longitudinal section runs through the locking element 302 in the adjustment position, and at a right angle through the adjustment unit 300. The cable pull 100 thus corresponds substantially to the cable pull in FIG. 7. The molded part 304 has the thickening 400 on the end facing away from the tie rod 108, as in FIG. 4. The thickening 400 rests against the lateral walls 320 (FIG. 3) of the guide. The first component of the toothing is thus at a spacing to the lateral walls 320. The sliding surfaces 608 of the locking element 302 rest on the first component of the toothing in the adjustment position, and thus enable a guided axial displacement of the tie rod 108 inside the adjustment unit 300. The thickening 400 is wider than the spacing between the sliding surfaces 608. As a result, the thickening 400 strikes against the locking element 302 at the end of the adjustment range, and prevents a falling of the tie rod 108 out of the guide in the adjustment unit 300. The thickening 400 acts as a loss protection, or safeguards it against becoming lost. The tie rod 108 with the molded part 304 can be moved axially in the guide within the adjustment range 1000.

In one exemplary embodiment, the adjustment range 1000 is reduced to ten millimeters.

Figure 11:
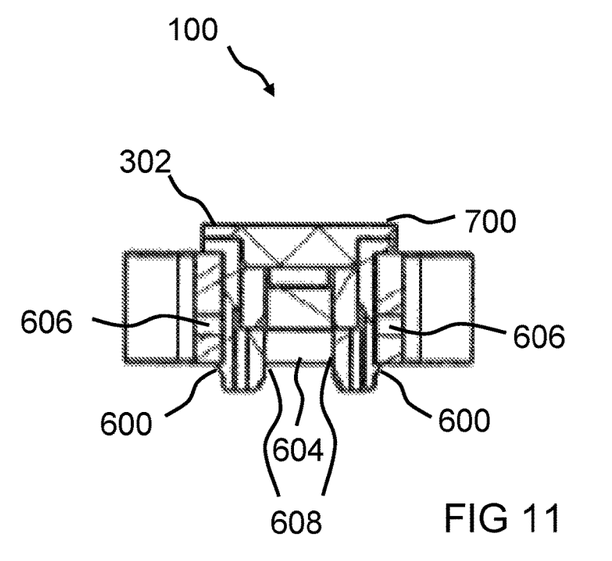
FIG. 11 shows a cross sectional depiction of a cable pull in the locked state, in accordance with an exemplary embodiment of the present disclosure.

FIG. 11 shows a cross sectional depiction of a cable pull 100 in the locked state, in accordance with an exemplary embodiment of the present disclosure. The cross section runs, as in FIG. 9, at a right angle through the locking element 302. The cable pull 100 thus corresponds substantially to the cable pull in FIG. 8. The locking element 302 is shown here in the locking position. The sliding surfaces 608 are thus slid parallel to the first component of the toothing, and the locking lugs 600 engage on the edges of the recess 604. In the locked state, the second components of the toothing engage in the first component in a form fitting manner.

When the locking element 300 is moved from the adjustment position into the locking position, the spring-loaded locking lugs are pressed into the recess 604 by means of the bevels on an edge of the pockets 606, slide along the lateral surfaces of the recess, and snap back at the edges of the recess.

Figure 12:
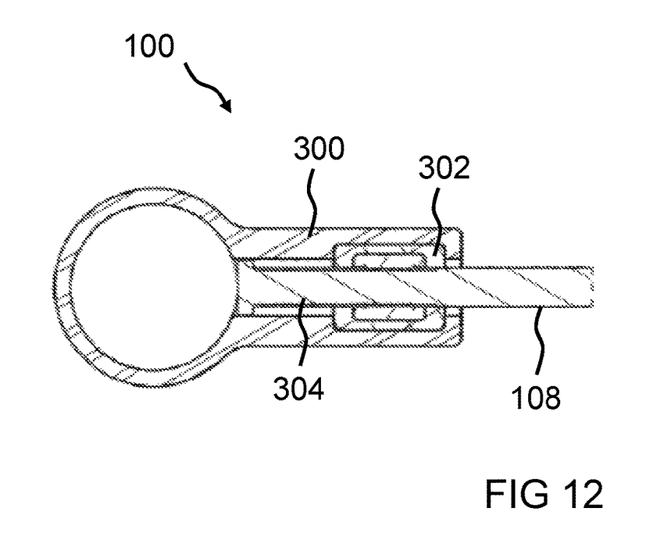
FIG. 12 shows a longitudinal section of a cable pull in the locked state, in accordance with an exemplary embodiment of the present disclosure.

FIG. 12 shows a longitudinal section of a cable pull 100 in the locked state, in accordance with an exemplary embodiment of the present disclosure. The longitudinal section runs through the locking element 302 in the locking position, and at a right angle through the adjustment unit 300. The cable pull 100 thus corresponds substantially to the cable pull in FIG. 10. As in FIG. 11, the first component of the toothing disposed on the molded part 304 engages in a form fitting manner in the second components of the toothing disposed on the locking element 302. As a result, the axial mobility of the molded part 304 in the guide is suppressed.

In the depicted exemplary embodiment, the tie rod 108 is pushed with the molded part into the guide as far as possible, and fixed in place there.

Figure 13:
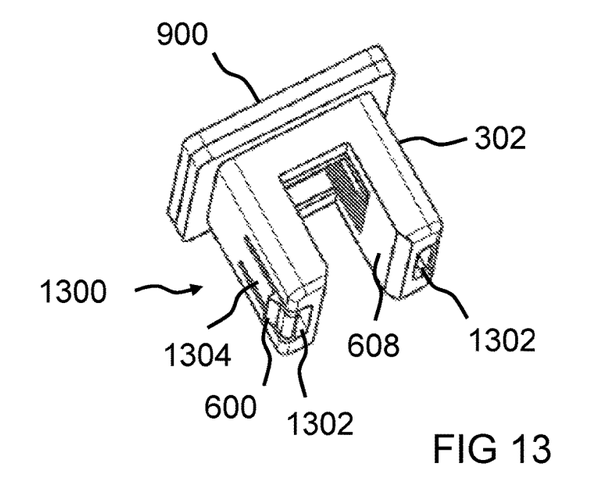
FIG. 13 shows a depiction of a locking element, in accordance with an exemplary embodiment of the present disclosure.

FIG. 13 shows a spatial depiction of a locking element 302 in accordance with an exemplary embodiment of the present disclosure. The locking element 302 is depicted here separately. The locking element 302 corresponds substantially to the locking element depicted in FIG. 9. As in FIG. 9, the locking element 302 has an insert 900, having the second components of the toothing. The insert 900 is encased in a plastic part, which has a locking mechanism 1300 of the locking element 302. The second components of the toothing extend above a plane of the sliding surface 608 by a distance of the depth of one tooth. On an end facing the sliding surface, the toothing transitions into bevels, in order to facilitate threading of the second component into the first component. Each leg of the locking element 302 has a pocket 1302 on an outer surface, in which a flexible tongue 1304 is disposed. Each tongue 1304 has a locking lug 600. The tongues 1304 are designed as mechanical springs, and are designed to counteract a deformation by means of a defined counter force.

Figure 14:
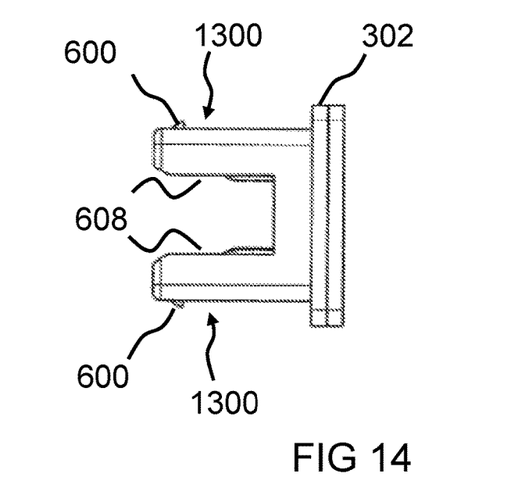
FIG. 14 shows a view of a locking element, in accordance with an exemplary embodiment of the present disclosure.

FIG. 14 shows a view of a locking element 302 in accordance with an exemplary embodiment of the present disclosure. The locking element 302 corresponds substantially to the locking element in FIG. 13. The U-shape of the locking element 302 with its two legs can be particularly well discerned here. Each leg has one sliding surface 608 on its inner surface, and one part of the second component of the toothing. Each of the sliding surfaces 608 have a bevel thereby, in order to facilitate the insertion of the locking element 302 into the recess in the adjustment unit. The leg has the locking mechanism 1300 on its outer surfaces, comprising the tongue and the locking lug 600. The locking lugs 600 each extend beyond the plane of the outer surface.

Figure 15:
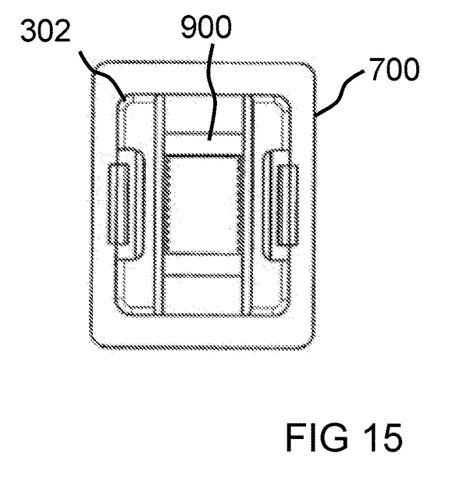
FIG. 15 shows a top view of a locking element, in accordance with an exemplary embodiment of the present disclosure.

FIG. 15 shows a top view of a locking element 302 in accordance with an exemplary embodiment of the present disclosure. The locking element 302 corresponds substantially to the locking element in FIG. 13. The locking element 302 is shown here from the direction of the leg. In the exemplary embodiment shown here, the insert 900 is disposed centrally in the locking element. The locking mechanism 1300 is disposed in the middle of the legs. The flange 700 is formed such that it encompasses the locking element. The flange 700 extends circumferentially beyond the legs that can be inserted into the recess in the adjustment device.

In one exemplary embodiment, the insert 900 has a length of 9 mm.

Figure 16:
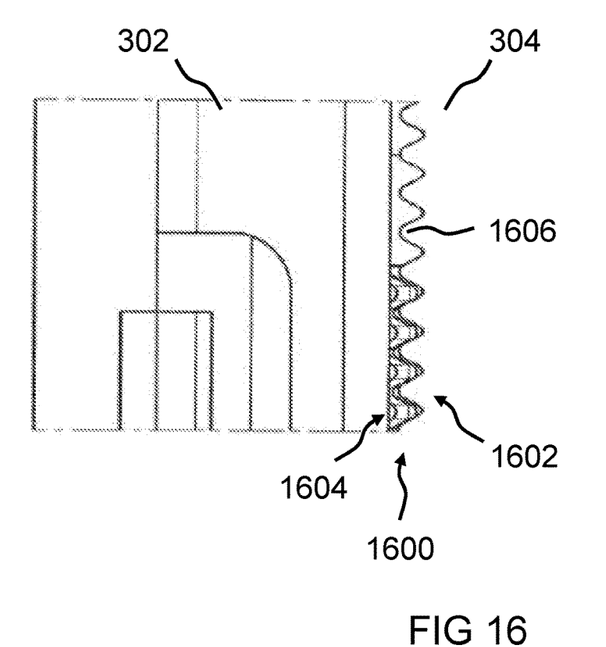
FIG. 16 shows a detail view of a form fitting connection, in accordance with an exemplary embodiment of the present disclosure.

FIG. 16 shows a detail view of a form fitting connection 1600, in accordance with an exemplary embodiment of the present disclosure. The form fitting connection 1600 comprises a toothing 1600. An excerpt of the depiction in FIG. 15 is shown. In addition, the molded part 304 is depicted with the first component 1602 of the toothing 1600. The locking element 302 has the second components 1604 of the toothing 1600. The components 1602, 1604 each have a row of successive teeth 1606.

In one exemplary embodiment, the teeth 1606 of the first component 1602 have the same shape as the teeth in the second component 1604. The teeth are each rounded at the bottom and at the top. The sides of the teeth are flat. The rounding at the bottom is smaller than at the top. As a result, the toothing has play at the top and at the bottom.

In one exemplary embodiment, the sides of the teeth are angled at 60°.

In one exemplary embodiment, the toothing 1600 has a tooth pitch of 0.5 mm.

Figure 17A:
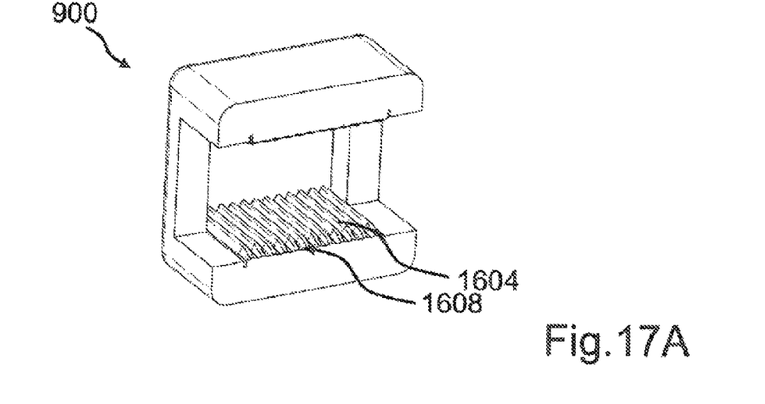
FIGS. 17a to 17c show a perspective view of an insert for a locking element, in accordance with an exemplary embodiment of the present disclosure.
Figure 17B:
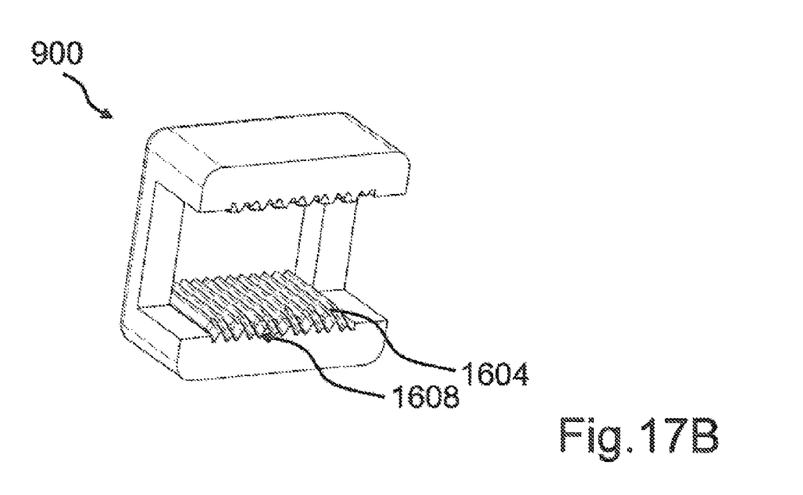
Figure 17C:
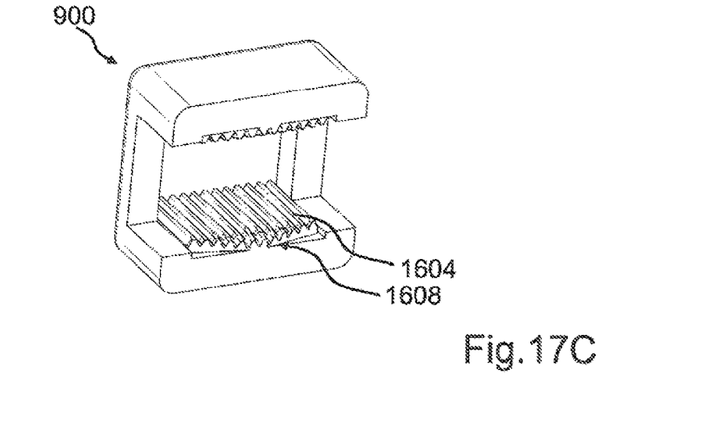

FIGS. 17A to 17C each show an insert 900 for a locking element 302, in accordance with an exemplary embodiment of the present disclosure. The inserts 900 are each U-shaped, wherein the second components 1604 of the toothing 1600 are disposed on the opposing inner surfaces of the legs of the U-shaped insert 900. The second components 1604 have a row of successive teeth 1606, which extend from the base of the U-shape to the free ends of the legs, wherein the ends of the teeth form an insertion bevel 1608 in the region of the free ends of the legs, by means of which the first component of the toothing 1600 engages with the second component 1604. The respective depicted inserts 900 differ in terms of the insertion bevels 1608, wherein each depicted design of the insertion bevel 1608 facilitates the insertion of the locking element 302 into the recess in the adjustment unit. The insertion bevel 1608 of the insert 900 shown in FIG. 17A is formed by a decreasing height of the tops of the teeth toward the free ends of the legs, such that the tops of the teeth of the second component 1604 at the free ends of the legs close to a plane comprising the bottoms of the teeth of the second component 1604. The insertion bevel 1608 of the insert 900 shown in FIG. 17B is formed by a decreasing height of the tops of the teeth of two adjacent teeth toward the free ends of the legs that differs in each case. Each second top of a tooth is in a common plane thereby, which is closer to the common plane of the respective bottom of the adjacent tooth than the common plane in which the other tops of the teeth end. The insertion bevel 1608 of the insert 900 shown in FIG. 17C is formed by a decreasing height of the tops of the teeth toward the free ends of the legs, wherein the tops of the teeth end in a common plane, which is at a spacing to the common plane of the bottoms of the teeth.

Furthermore, the respective teeth 1606 of the second component 1604, which end at the free leg ends, have a shorter length, starting from the base of the U-shape, on a tooth-to-tooth basis, toward the respective outermost teeth 1606, starting at two central adjacent teeth 1606. As a result, the insert bevel 1608 forms a V-shape at the free ends of the legs, having a point directed toward the insertion direction of the insert 900.

Figure 18:
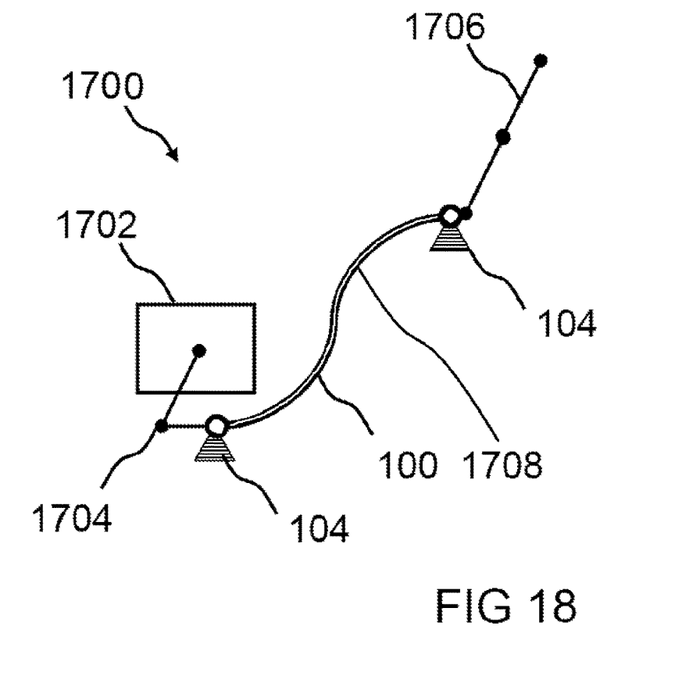
FIG. 18 shows a block diagram of a transmission system, in accordance with an exemplary embodiment of the present disclosure.

FIG. 18 shows a block diagram of a transmission system 1700, in accordance with an exemplary embodiment of the present disclosure. The transmission system 1700 has a transmission 1702 with a pivot point 1704, a gearshift lever 1706, and a cable pull 100 in accordance with the approach presented herein. The cable pull 100 connects the gearshift lever 1706 to the pivot point 1704 thereby. The cable pull 100 is designed to transmit a tensile force from the gearshift lever 1706 to the pivot point 1704. The cable pull 100 is flexible, and can move through curves. Two counter bearings disposed on opposing ends of a casing 1708 support the counter force to the tensile force.

Figure 19:
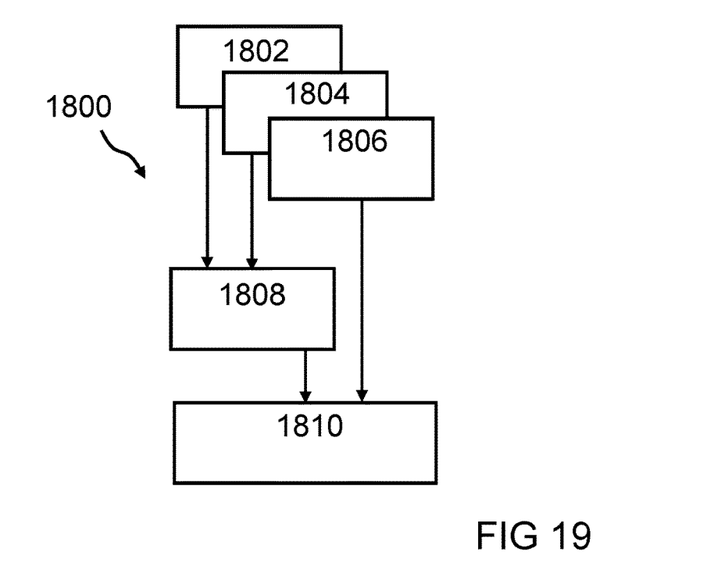
FIG. 19 shows a flow chart of a method for the production of a cable pull, in accordance with an exemplary embodiment of the present disclosure.

FIG. 19 shows a flow chart for a method 1800 for producing a cable pull according to an exemplary embodiment of the present disclosure. The method 1800 has three steps 1802, 1804, 1806 for provision, a step 1808 for the arrangement, and a step 1810 for the insertion. In the provision step 1802, a tie rod having a molded part, coupled to a wire core of the cable pull is provided. The molded part has a first component of a toothing. The tie rod is axially supported in a counter bearing connected to a casing of the cable pull. In the provision step 1804, an adjustment unit for adjusting a length of the cable pull between the counter bearing and the pivot point is provided. The adjustment unit has a guide for receiving the molded part, and a recess for receiving a locking element. In the provision step 1806, the locking element for fixing the molded part in the adjustment unit is provided. The locking element has a second component of the toothing, which is designed to engage in the first component in a form fitting manner, and to suppress the axial movement of the molded part in the guide. In the arrangement step 1808, the molded part is disposed in the guide of the adjustment unit. In the insertion step 1810, the locking element is pressed into the recess, until the locking element is disposed in an adjustment position, in which the molded part is connected to the adjustment device such that it secured against loss.

The exemplary embodiments described and shown in the figures are selected only by way of example. Different exemplary embodiments can be combined with one another, either in their entirety, or with respect to individual features. Moreover, one exemplary embodiment can be supplemented with features of another exemplary embodiment.

Furthermore, method steps according to the disclosure can be repeated, or executed in a different sequence than that in the description.

If an exemplary embodiment comprises an "and/or" conjunction between a first feature and a second feature, this can be read to mean that the exemplary embodiment exhibits the first feature as well as the second feature according to one embodiment, and exhibits either only the first feature or only the second feature according to another embodiment.

REFERENCE SYMBOLS

100 Cable pull
102 Length adjustment device
104 Counter bearing
106 Sleeve
108 Tie rod
110 End piece
112 Screw connection
114 Ball lining
200 End
202 Elongated hole
300 Adjustment unit
302 Locking element
304 Molded part
400 Thickening
600 Locking lug
602 Edge
604 Recess
606 Pocket
608 Sliding surface
700 Flange
900 Insert
1000 Adjustment range
1300 Locking mechanism
1302 Pocket
1304 Tongue
1600 Toothing
1602 First component of the toothing
1604 Second component of the toothing
1606 Tooth
1608 Insertion bevel
1700 Transmission system
1702 Transmission
1704 Pivot point
1706 Gearshift lever
1708 Casing
1800 Method for producing a cable pull
1802 Provision of a molded part
1804 Provision of an adjustment unit
1806 Provision of a locking element
1808 Arrangement of the molded part
1810 Insertion of the locking element

The invention claimed is:

1. A cable pull for transmitting a force for a transmission system for a vehicle, comprising:
   a counter bearing for introducing a counter force, counter to the force, into a casing of the cable pull;
   a tie rod, which is axially supported in the counter bearing and is coupled to a wire core of the cable pull, wherein the tie rod has a molded part with a first component of a toothing on an end protruding out of the counter bearing;
   an adjustment unit for adjusting a length of the cable pull, wherein the adjustment unit has a guide for the molded part, wherein the molded part is configured to move axially in the guide; and
   a locking element for fixing the molded part in place in the adjustment unit, wherein the locking element is disposed in a recess in the adjustment unit oriented such that the adjustment unit is transverse to the guide, wherein the locking element can move between a locking position and an adjustment position, wherein the locking element has a second component of the toothing which is designed to engage with the first component in a form fitting manner when in the locking position and to suppress an axial movement of the molded part in the guide,
   wherein the locking element comprises an insert made of a material that exhibits a greater mechanical loading capacity than a material of a remainder of the locking element, wherein at least one part of the second component of the toothing is formed on the insert.

2. The cable pull according to claim 1, wherein the first component of the toothing and the second component of the toothing has a tooth pitch that is less than one millimeter.

3. The cable pull according to claim 1, wherein the first component of the toothing and the second component of the toothing has a tooth pitch that is less than three quarters of a millimeter.

4. The cable pull according to claim 1, wherein the first component of the toothing and the second component of the toothing has a tooth pitch of less than one half of a millimeter.

5. The cable pull according to claim 1, wherein the material for the insert is a metallic substance, and the material for the remainder of the locking element is a plastic substance.

6. The cable pull according to claim 1, wherein the molded part comprises a rectangular cross section, wherein the first component of the toothing is disposed on two opposing lateral surfaces of the molded part.

7. The cable pull according to claim 1, wherein the molded part comprises a thickening on an end lying opposite the tie rod which extends beyond the first component of the toothing, wherein the thickening rests against lateral walls of the guide, and the first component exhibits a spacing to the lateral walls.

8. The cable pull according to claim 1, wherein the locking element has at least one locking lug which is designed to engage with a first edge of the adjustment unit in a form fitting manner when in the adjustment position in order to secure the locking element against removal from the recess, wherein the locking lug has a bevel which allows the locking lug to be pressed into the recess when moved into the locking position, wherein the locking lug is designed to engage with a second edge of the adjustment unit in a form fitting manner when in the locking position in order to secure the locking element against removal from the locking position.

9. The cable pull according to claim 8, wherein the adjustment unit comprises a cut-out pocket and wherein the first edge of the adjustment unit is located in the cut-out pocket.

10. The cable pull according to claim 8, wherein the locking element comprises a pocket on an outer surface and a flexible tongue disposed in the pocket, wherein the at least one locking lug is disposed on the flexible tongue.

11. The cable pull according to claim 1, wherein the locking element has a sliding surface, wherein the sliding surface is disposed adjacent to the first component when in the adjustment position, and is disposed offset to the first component when in the locking position.

12. The cable pull according to claim 1, wherein the first component of the toothing and the second component of the toothing is formed with insertion bevels.

13. The cable pull according to claim 1, wherein the teeth of the first component of the toothing and the second component of the toothing are each rounded at the bottom of the teeth and at the top of the teeth.

14. The cable pull according to claim 1, wherein the locking element comprises a flange that is spaced apart from the adjustment unit in the adjustment position and adjacent to the adjustment unit in the locking position.

15. The cable pull according to claim 1, wherein the locking element is substantially U-shaped and has two spaced apart legs, wherein the second component of the toothing is located on inner surfaces of the legs, wherein the molded part is between the legs when the molded party is fixed in place in the adjustment unit.

16. The cable pull according to claim 12, wherein the locking element is substantially U-shaped and has two spaced apart legs, wherein the insertion bevels comprise a decreasing height of tops of the teeth toward free ends of the legs.

17. A transmission system comprising:
a transmission with a pivotable connection and with a gearshift lever for a vehicle,
a cable pull comprising:
first and second counter bearings for introducing a counter force into a casing of the cable pull;
a tie rod, which is axially supported in the first counter bearing and is coupled to a wire core of the cable pull, wherein the tie rod has a molded part with a first component of a toothing on an end protruding out of the first counter bearing;
an adjustment unit for adjusting a length of the cable pull, wherein the adjustment unit has a guide for the molded part, wherein the molded part can move axially in the guide; and
a locking element for fixing the molded part in place in the adjustment unit, wherein the locking element is disposed in a recess in the adjustment unit oriented such that it is transverse to the guide, wherein the locking element can move between a locking position and an adjustment position, wherein the locking element has a second component of the toothing which is designed to engage with the first component in a form fitting manner when in the locking position and to suppress an axial movement of the molded part in the guide;
wherein the cable pull connects the gearshift lever to the pivotable connection, and is designed to transmit a force from the gearshift lever to the pivotable connection, wherein the first and second counter bearings are formed on opposite ends of the casing of the cable pull in order to support the counter force to the force,
wherein the locking element comprises an insert made of a material that exhibits a greater mechanical loading capacity than a material of a remainder of the locking element, wherein at least one part of the second component of the toothing is formed on the insert.

* * * * *